US012451301B2

(12) United States Patent
O'Brien et al.

(10) Patent No.: US 12,451,301 B2
(45) Date of Patent: Oct. 21, 2025

(54) INTERLOCKING MECHANISM FOR A SWITCHING DEVICE

(71) Applicant: Eaton Intelligent Power Limited, Dublin (IE)

(72) Inventors: Seth Tyler O'Brien, Ooltewah, TN (US); James Windelon Adams, Chatsworth, GA (US)

(73) Assignee: Eaton Intelligent Power Limited, Dublin (IE)

( * ) Notice: Subject to any disclaimer, the term of this patent is extended or adjusted under 35 U.S.C. 154(b) by 541 days.

(21) Appl. No.: 18/051,315

(22) Filed: Oct. 31, 2022

(65) Prior Publication Data

US 2023/0133635 A1 May 4, 2023

Related U.S. Application Data

(60) Provisional application No. 63/273,615, filed on Oct. 29, 2021.

(51) Int. Cl.

| | |
|---|---|
| ***H01H 9/20*** | (2006.01) |
| ***H01H 21/22*** | (2006.01) |
| ***H01H 21/36*** | (2006.01) |

(52) U.S. Cl.

CPC .............. *H01H 9/20* (2013.01); *H01H 21/22* (2013.01); *H01H 21/36* (2013.01)

(58) Field of Classification Search

None

See application file for complete search history.

(56) References Cited

U.S. PATENT DOCUMENTS

| | | | |
|---|---|---|---|
| 6,373,009 | B1 | 4/2002 | Prohaska et al. |
| 10,373,780 | B2 | 8/2019 | Jur et al. |
| 10,485,120 | B1 | 11/2019 | Adams et al. |

FOREIGN PATENT DOCUMENTS

| | | | |
|---|---|---|---|
| CA | 2934925 | A1 | 6/2016 |

*Primary Examiner* — Thomas S McCormack

(74) *Attorney, Agent, or Firm* — MERCHANT & GOULD P.C.

(57) ABSTRACT

An interlocking mechanism for a switching device is provided. The interlocking mechanism includes an interlocking arm having a first end and a second end. The interlocking arm is movable between a first position and a second position. When positioned in the first position, the second end of the interlocking arm forms a releasable contact with switching device blocking operation of the switching device. When positioned in the second position, the second end of the interlocking arm withdraws from the releasable contact with the switching device allowing operation of the switching device. The interlocking mechanism further includes an actuator connected to the interlocking arm. The actuator, in response to receiving actuator signal, moves the interlocking arm between the first position and the second position.

20 Claims, 11 Drawing Sheets

INTERLOCKING MECHANISM FOR A SWITCHING DEVICE

CROSS-REFERENCE TO RELATED APPLICATION

This application claims the benefit of U.S. Provisional Patent Application No. 63/273,615, filed Oct. 29, 2021. The disclosure of the priority application in its entirety is hereby incorporated by reference into the presence application.

TECHNICAL FIELD

The present disclosure relates generally to a switching device. More specifically, the present disclosure relates to an interlocking mechanism for conditionally allowing operation of the switching device.

BACKGROUND

Switching devices, such as, electrical switches, are used to control flow of electrical current. For example, electrical switches form an electrical connection allowing flow of current when switched on and interrupt an electrical connection disrupting the flow of current when switched off. Electrical switches are generally enclosed in cabinets that have an operating handle located outside the cabinets. The operating handle is used to operate the electrical switch. For example, the operating handle is rotated to an off position to interrupt a connection and is rotated to an on position to form an electrical connection. There may be a need for a mechanism that conditionally allows operation of the electrical switches.

SUMMARY

One aspect of the present disclosure relates to an interlocking mechanism for a switching device. The interlocking mechanism can include an interlocking arm that has a first end and a second end. The interlocking arm can be movable between a first position and a second position. When positioned in the first position, the first end of the interlocking arm forms a releasable contact with a switch operating mechanism of a switching device to block operation of the switching device. When positioned in the second position, the first end of the interlocking arm withdraws from the releasable contact with the switch operating mechanism of the switching device to allow operation of the switching device. The interlocking mechanism further includes an actuator connected to the interlocking arm. The actuator, in response to receiving an actuator signal, moves the interlocking arm between the first position and the second position.

Another aspect of the present disclosure relates to a switching device that includes a cabinet and a switch control handle mounted outside the cabinet. The switch control handle can be pivotally movable about a handle axis between an off position and an on position. The switching device can further include a circuit unit mounted inside the cabinet and an actuator shaft connected to the circuit unit. The actuator shaft shifts the circuit unit to an open configuration when the switch control handle moves to the off position and shifts the circuit unit to a closed configuration when the switch control handle moves to the on position. The switching device can further include a crank member that can be pivoted at the handle axis and connected to the switch control handle. The switching device further includes an interlocking arm having a first end and a second end. The interlocking arm is movable between a first position and a second position. When positioned in the first position, the first end of the interlocking arm forms a releasable contact with the crank member to block pivotal movement of the switch control handle at the handle axis. When positioned in the second position, the first end of the interlocking arm withdraws from the releasable contact with the crank member to allow operation of the switch control handle. The switching device further includes an actuator connected to the interlocking arm. The actuator, in response to receiving an actuator signal, moves the interlocking arm between the first position and the second position.

Yet another aspect of the present disclosure relates to a method of operating a switching device. The method includes steps of: determining that a pre-determined condition for operating a switching device is met; generating, in response to determining that the pre-determined condition for the switching device is met, an actuator signal; and sending the actuator signal to an actuator connected to an interlocking arm of an interlocking device, the actuator, in response to receiving the actuator signal, moves the interlocking arm from a first position to a second position, wherein the interlocking arm includes a first end and a second end, wherein when positioned in the first position, the first end of the interlocking arm forms a releasable contact with the switch operating mechanism of the switching device to block operation of the switching device, and when positioned in the second position, the second end of the interlocking arm withdraws from the releasable contact with the switch operating mechanism of the switching device to allow operation of the switching device.

BRIEF DESCRIPTION OF THE DRAWINGS

The accompanying drawings which are incorporated in and constitute a part of the description, illustrate several aspects of the disclosure. A brief description of the drawings is as follows.

DETAIL DESCRIPTION

Reference will now be made in detail to exemplary aspects of the present disclosure that are illustrated in the accompanying drawings. Wherever possible, the same reference numbers will be used throughout the drawings to refer to the same or like structure.

A switching device (for example, electrical switch or a disconnect device) is typically used for controlling a flow of current by forming or interrupting an electrical connection. A switching device is generally housed in a cabinet or a box. The cabinet has an operating handle (also referred to as an operating lever or a switch handle) located outside the cabinet to operate the switching device. The operating handle is rotated along a pivot axis to an off position to interrupt an electrical connection and is rotated to an on position to an electrical connection. Some applications may require one or more pre-determined criteria to be met before the electrical connection is interrupted or formed.

This disclosure provides an interlocking mechanism for selective operation of a switching device. For example, and as discussed in greater detail in the following sections of the disclosure, the interlocking mechanism disclosed herein allows the operation of the switching device when one or more pre-determined criteria for forming or interrupting the electrical connection is met.

Figure 1:
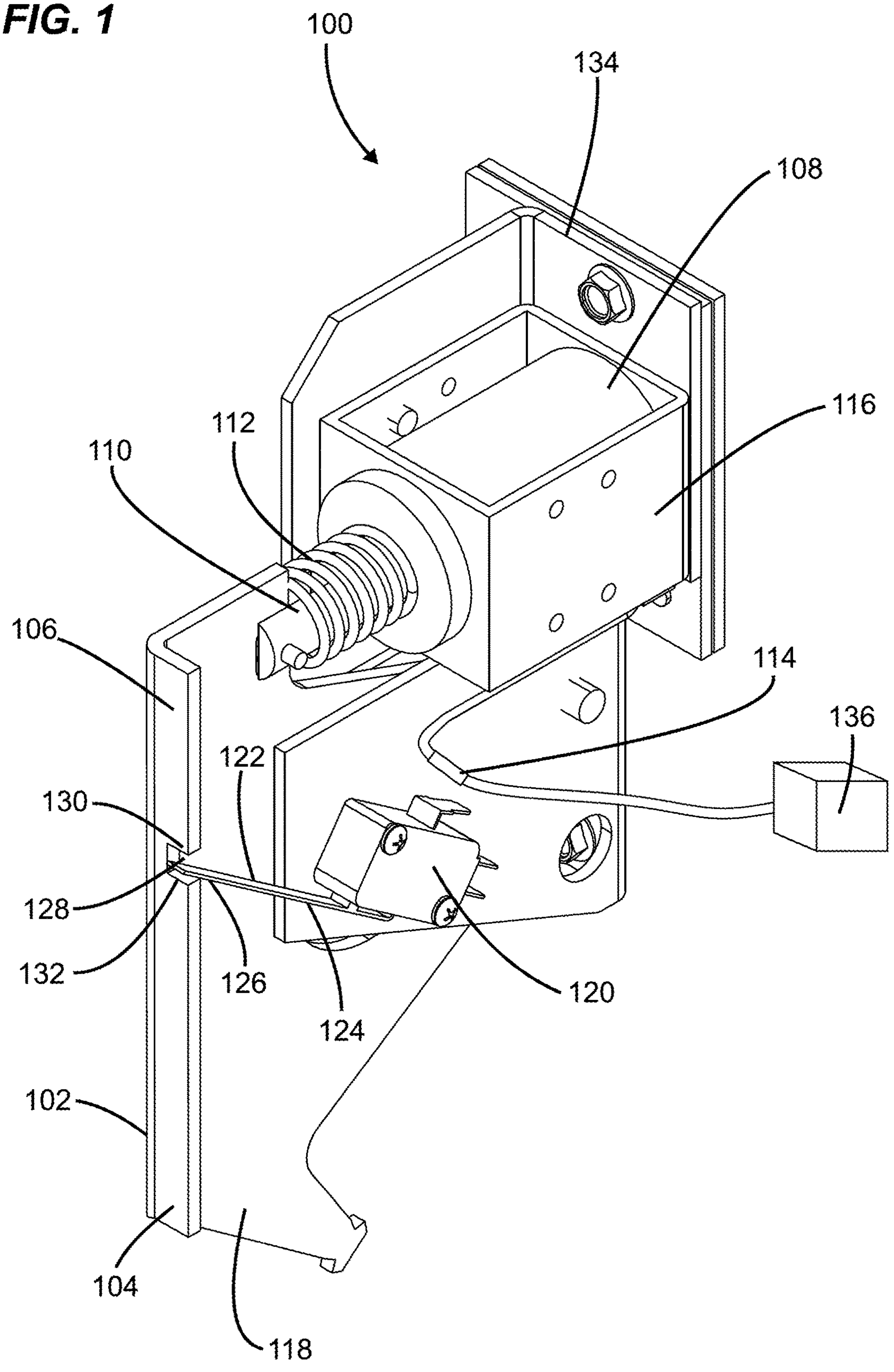
FIGS. 1-2 illustrate an interlocking mechanism for a switching device in accordance with principles of the present disclosure.
Figure 7:
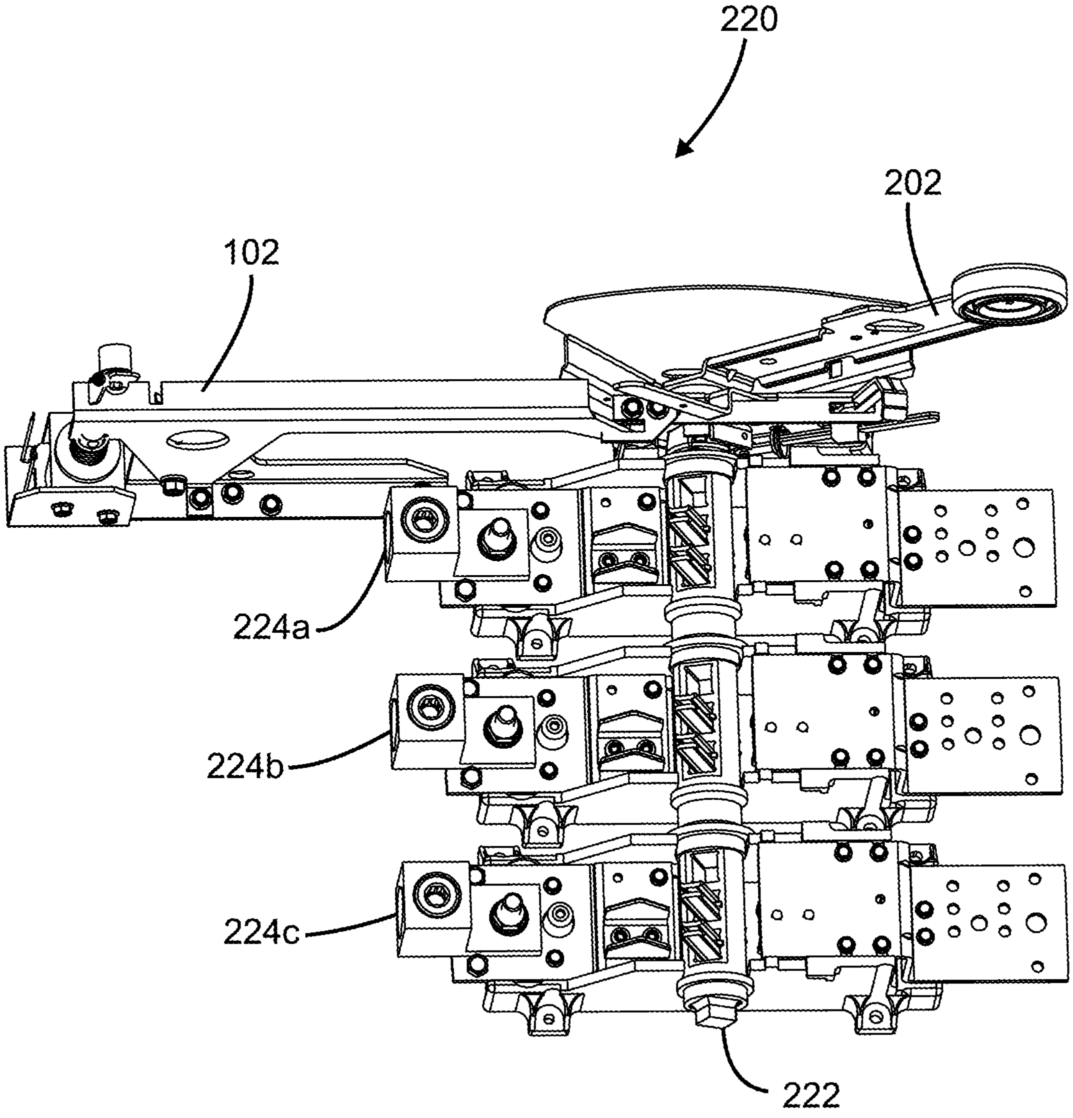
FIG. 7 illustrates a switching device with switching units.

FIG. 1 illustrate an interlocking mechanism 100 for a switching device, for example, a switching device 220 shown in FIG. 7. Interlocking mechanism 100 includes an interlocking arm 102 having a first end 104 and a second end 106. Interlocking arm 102 is movable or rotatable in an arc between a first position and a second position. In examples, when interlocking arm 102 is in the first position, first end 104 of interlocking arm 102 forms a releasable contact (shown in FIG. 4) with a switch operating mechanism (for example, a switch operating mechanism 200 shown in FIGS. 4-5) of switching device 220 thereby preventing the operation of switching device 220. When interlocking arm 102 is moved or rotated to the second position, first end 104 of interlocking arm 102 disengages or retracts from the releasable contact (shown in FIG. 5) with switch operating mechanism 200 thereby allowing the operation of switching device 220.

In examples, interlocking arm 102 is moved or rotated between the first position and the second position through an actuator 108. Actuator 108 is connected to second end 106 of interlocking arm 102. In some examples, actuator 108 includes an actuator plunger 110. In such examples, second end 106 of interlocking arm 102 is connected to actuator 108 through actuator plunger 110.

In some examples, actuator 108 can include a solenoid. The solenoid of actuator 108 can include a coil of a metal wire. When actuator 108 is energized, that is, when electrical current flows through the coil, a magnetic field is formed around the coil which draws actuator plunger 110 inwards that causes interlocking arm 102 to move or rotate from the first position to the second position. When actuator 108 is de-energized, that is, when the electrical current flowing through the coil is stopped or interrupted, the magnetic field around the coil dissipates and actuator plunger 110 is released causing interlocking arm 102 to move to the first position from the second position.

In some examples, a spring 112 is coiled around actuator plunger 110. Spring 112 is provided to assist in movement of interlocking arm 102. For example, spring 112 stores energy when actuator 108 draws actuator plunger 110 in and releases the stored energy when actuator 108 is de-energized. In some examples, the electrical current is provided to actuator 108 through input terminals 114. In some examples, the electrical current for actuator 108 is provided from the electrical switch. In other examples, the electrical current for actuator 108 is provided from an external source.

Actuator 108 is housed within an actuator housing 116. Actuator housing 116 is fixed or attached to an interlocking base 134. In some examples, first end 104 of interlocking arm 102 includes an interlocking head 118. A shape and size of interlocking head 118 is designed to form the releasable contact with switch operating mechanism 200 of switching device 220.

Interlocking mechanism 100 further includes a status mechanism 120. Status mechanism 120 can provide an indication of a current position of interlocking arm 102. In some examples, status mechanism 120 provides an indication when interlocking arm 102 is disengaged from or retracted from the releasable contact with switch operating mechanism 200 rendering switching device 220 operable. The indication can be provided in form of an indication light although alternatives are possible. For example, the indication light turns green when interlocking arm 102 is disengaged or retracted from the releasable contact rendering switching device 220 operable and turns red when interlocking arm 102 is engaged with or positioned on the releasable contact rendering switching device 220 inoperable. In some examples, the indication is provided in form of sound or a signal. In other examples, the indication is provided in form of a text message or a voice message.

Status mechanism 120 includes a status arm 122. A first end 124 of status arm 122 is connected to status mechanism 120 and a second end 126 of status arm 122 is located in a status notch 128 of interlocking arm 102. Status notch 128 includes a first side 130 and a second side 132 opposite first side 130. In some examples, status arm 122 is in contact with first side 130 of status notch 128 when interlocking arm 102 is in the second position and is in contact with second side 132 of status notch 124 when interlocking arm 102 is in the first position. Thus, status mechanism 120 provides the current position of interlocking arm 102 based on the current position of status arm 122. In some other examples, status mechanism 120 can detect the current position of interlocking arm 102 by sensing an amount of current being consumed by or flowing through actuator 108. For example, status mechanism 120 can detect that interlocking arm 102 is in the first position when the amount of current being consumed by or flowing through actuator 108 is approximately equal to zero and is in the second position when the amount of current being consumed by or flowing through actuator 108 is greater than zero.

In certain examples, actuator 108 is energized in response to receiving an actuator signal. The actuator signal is received over a wired network or a wireless network. In some examples, the actuator signal is received from a programmable circuit 136. Programmable circuit 136 determines that a pre-determined condition for operating switching device 220 is met, generates, in response to determining that the pre-determined condition for operating switching device is 220 met, the actuator signal, and sends the actuator signal to actuator 108. In response to receiving the actuator signal, actuator 108 is energized thereby allowing operation of switching device 220.

In examples, the pre-determined condition may include checking that one or more loads are switched off. In another example, the pre-determined condition may include determining that a device or equipment that draws more than a predetermined amount of current is switched off. In yet another example, the pre-determined condition may include determining that exposed wires or exposed contacts are covered to sealed.

In some examples, actuator 108 is energized for a predetermined time period. In other examples, actuator 108 is energized until switching device 220 is operated, that is, switched on or switched off. Programmable circuit 136 can be remote from actuator 108 or can be co-located with actuator 108. Programmable circuit 136 can be programmed to check one or more pre-determined conditions for operating the switch. In some examples, the one or more conditions can be dynamically changed.

In some examples, the actuator signal is received from a facility manager of a facility where switching device 220 to be operated is located. For example, the facility manager sends the actuator signal to actuator 108 over a wired network or a wireless network. In other examples, the actuator signal is received from a work site manager performing maintenance at the facility.

In certain examples, interlocking arm 102 is rotatable or movable around an arm axis 140. Arm axis 140 is also referred to as an arm pivot or simply as pivot. An arm axis fastener 142 is used to control ease of rotation at arm axis 140. For example, arm axis fastener 142 can be tightened and loosened to control the ease of rotation of interlocking arm 102. An arm base fastener 144 is used for fastening interlocking arm 102 to interlocking base 118. In examples, arm base fastener 144 is also used for controlling a degree of rotation or movement of interlocking arm 102. For example, arm base fastener 144 is tightened or loosened to decrease or increase the degree of rotation or movement of interlocking arm 102.

A plurality of actuator fasteners 146 are used for fastening actuator housing 116 to interlocking base 118. A plurality of interlocking fasteners 148 are used for fastening interlocking base 118 or interlocking mechanism 100 to the cabinet of the electrical switch. Plurality of actuator fasteners 146 and plurality of interlocking fasteners 148 may include nuts, bolts, screws, studs, etc.

Figure 2:
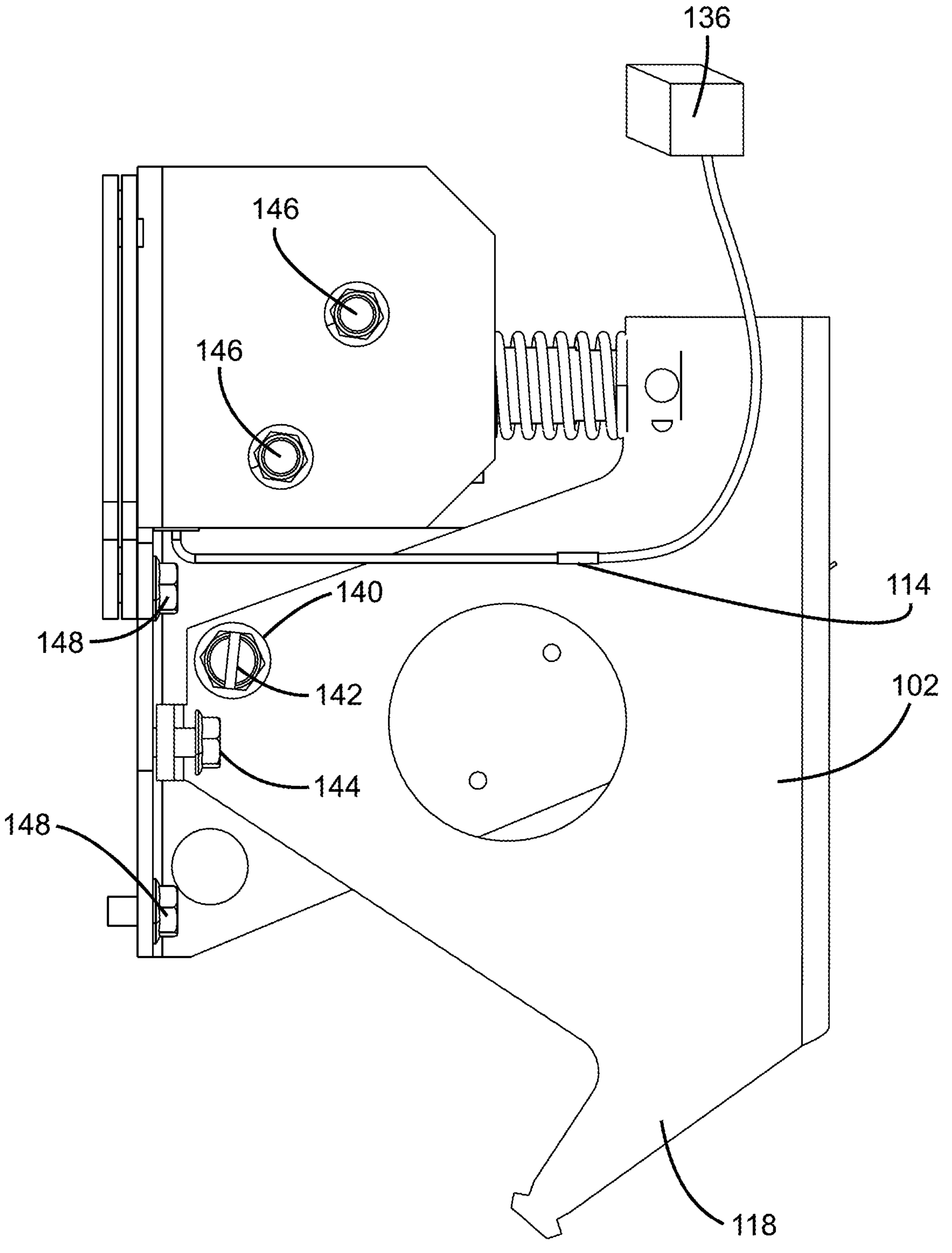
Figure 3:
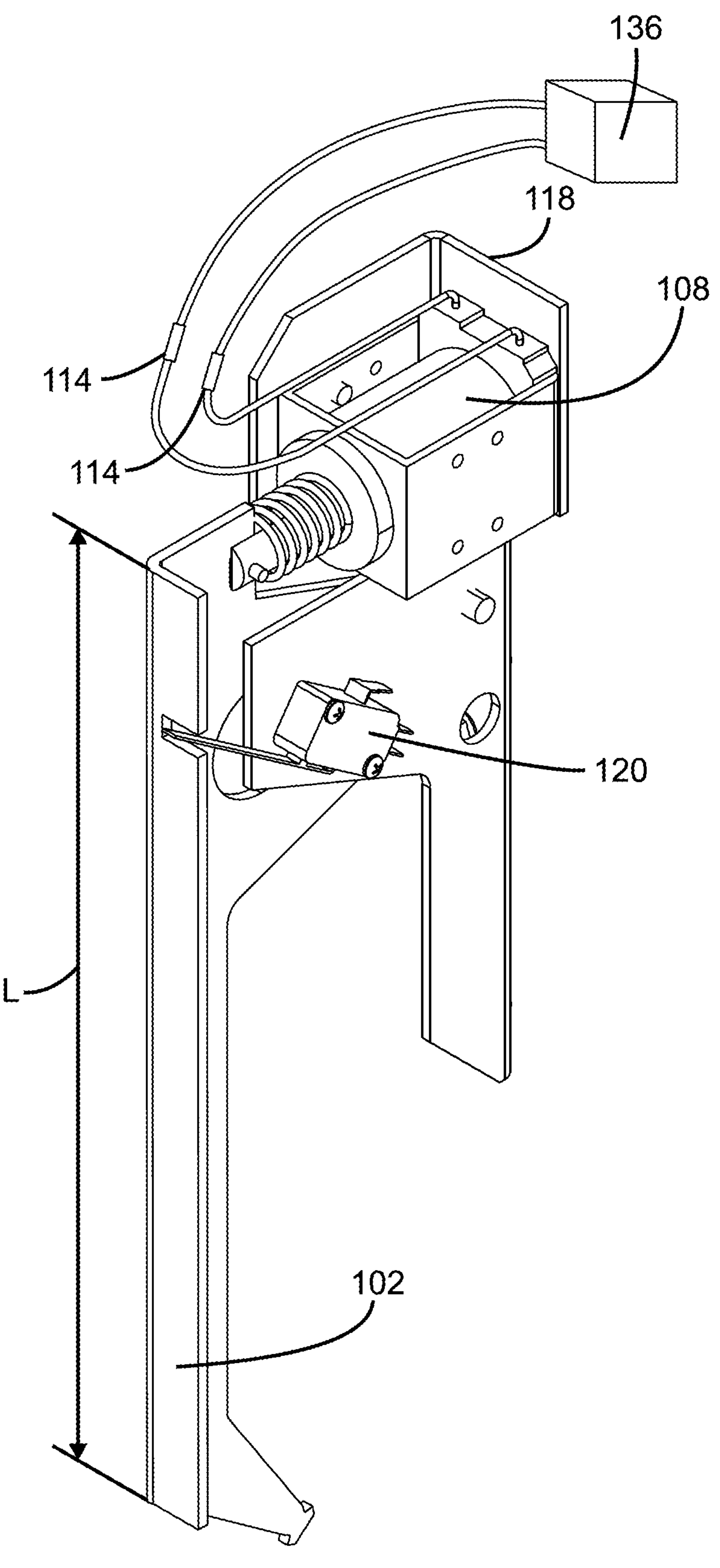
FIG. 3 illustrates interlocking mechanism of FIG. 1 with a different interlocking arm in accordance with the principles of the present disclosure.

In examples, a length and a shape of interlocking arm 102 is configurable. FIG. 3 illustrates another interlocking mechanism 100' for switching device 220 in accordance with the principles of the present disclosure. Interlocking mechanism 100' of FIG. 3 includes another interlocking arm 102'. As shown in FIG. 3, a length L and a shape of interlocking arm 102' of FIG. 3 is different from a length and shape of interlocking arm 102 of FIGS. 1 and 2. For example, the length L and the shape of interlocking arm 102' of FIG. 3 is longer compared to the length of interlocking arm 102 in FIGS. 1 and 2. In examples, both interlocking mechanism 100 of FIGS. 1-2 and another interlocking mechanism of FIG. 3 works in a similar fashion.

In examples, the length and the shape of interlocking arm 102, therefore, can depend upon an available space inside a cabinet, for example, enclosure 300 shown in FIG. 7, of switching device 220 for fastening interlocking mechanism 100. In other examples, the length and the shape of interlocking arm 102 is can depend upon a voltage/current rating of switching device 220. For example, a longer interlocking arm 102' of FIG. 3 is used for higher voltage/current ratings than interlocking arm 102 of FIGS. 1 and 2.

Figure 4:
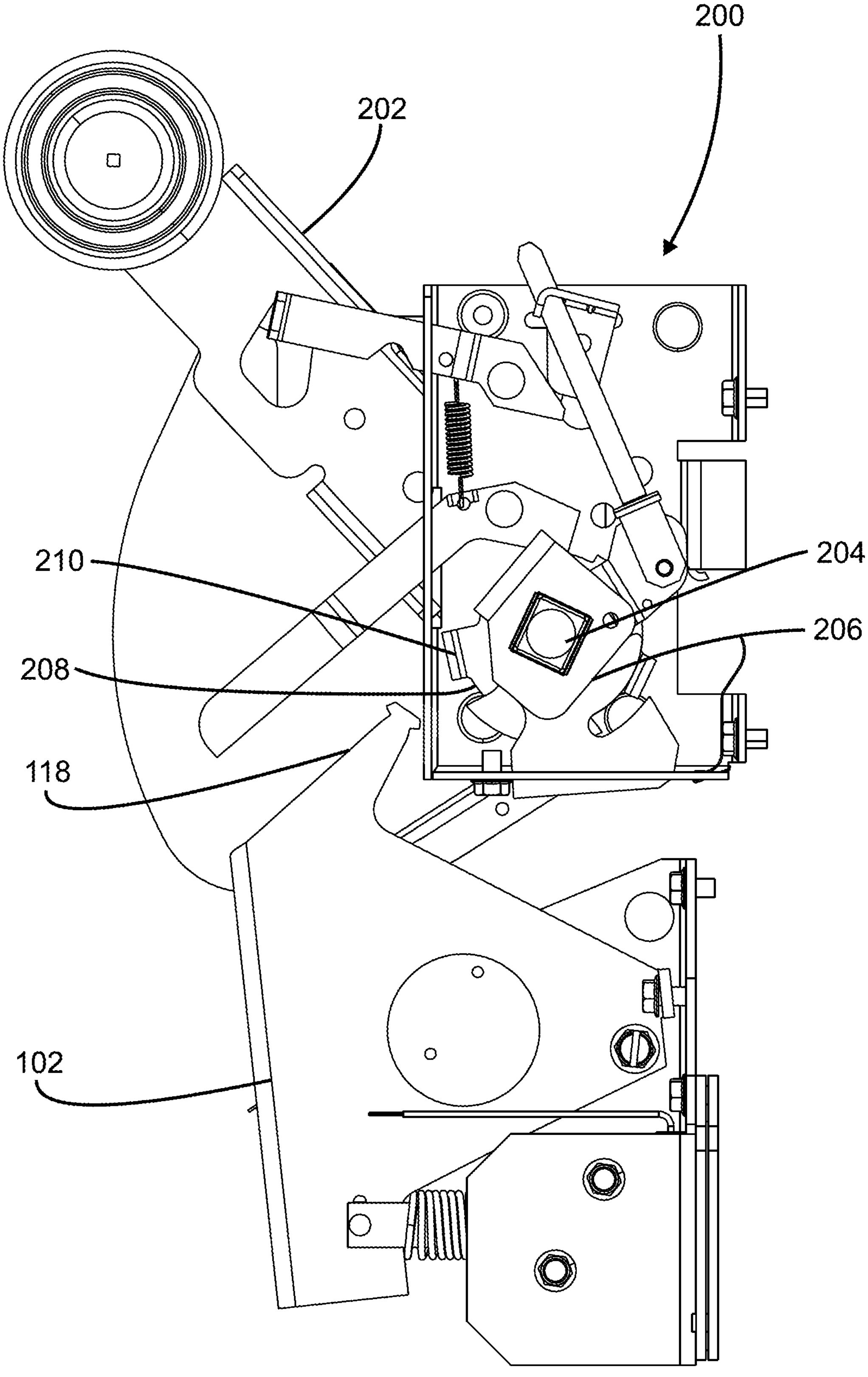
FIG. 4 illustrates the interlocking mechanism of FIGS. 1-3 retracted from a releasable contact with a switch operating mechanism of a switching device.

FIG. 4 illustrates interlocking mechanism 100 retracted from a releasable contact with switch operating mechanism 200 of switching device 220. Switch operating mechanism 200 includes a switch control handle 202 (also referred to as a handle bar). Switch control handle 202 is pivoted at a handle pivot axis 204. Switch control handle 202 is rotatable about an arc at handle pivot axis 204 between a first operating position and a second operating position. In depicted example, the first operating position can be a power-off position (also referred to as a power off configuration or a disconnect position) and the second operating position can be a power-on (also referred to as a power on configuration or a connect position).

Switch operating mechanism 200 further includes a crank member 206. Crank member 206 is also pivoted at handle pivot axis 204 and is moveably connected to switch control handle 202. For example, crank member 206 rotates or moves when switch control handle 202 is rotated or moved. In some examples, crank member 206 rotates in a same direction as switch control handle 202.

Crank member 206 includes a contact slot 208. In examples, contact slot 208 is a depression or an opening in a periphery of crank member 206. A shape and size of contact slot 208 is designed to receive first end 104 (or interlocking head 118) of interlocking arm 102. For example, the shape and size of releasable contact slot 208 is reciprocal to the shape and size of interlocking head 112 of interlocking arm 102. In some examples, crank member 206 further includes a blocking member 210 adjacent to contact slot 208. Blocking member 210 impedes rotation of crank member 206 when first end 104 of interlocking arm 102 is positioned in contact slot 208.

Figure 5:
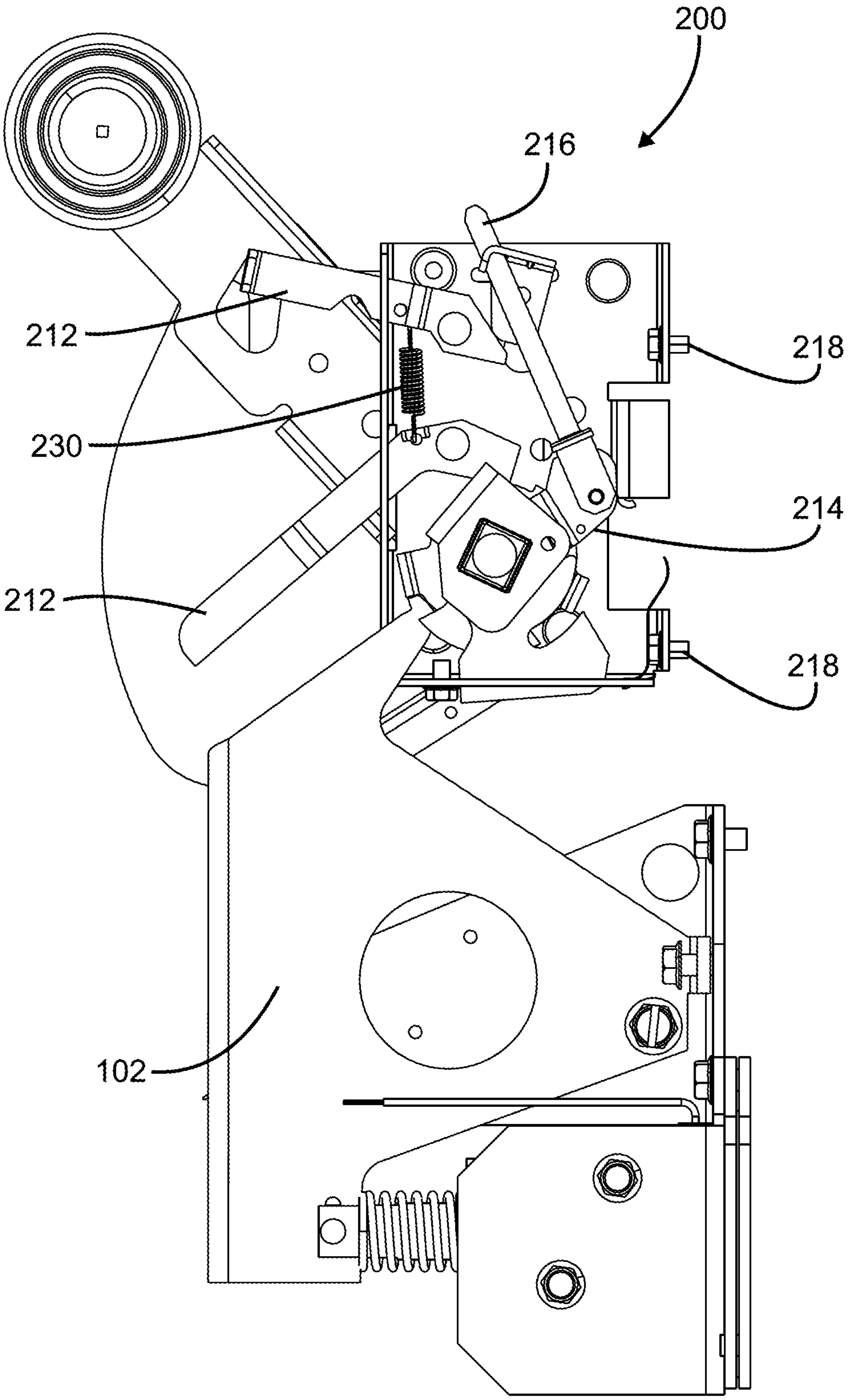
FIG. 5 illustrate the interlocking mechanism of FIGS. 1-3 forming a releasable contact with the switch operating mechanism of a switching device.

In examples, interlocking arm 102 of interlocking mechanism 100 forms a releasable contact with switch operating mechanism 200. FIG. 5 illustrates interlocking mechanism 100 forming a releasable contact with switch operating mechanism 200 of switching device 220. For example, and as shown in FIG. 5, when positioned in the first position, interlocking head 112 of interlocking arm 102 slides into contact slot 208 of crank member 206 forming a releasable contact with crank member 206 of switch operating mechanism 200. When interlocking head 112 of interlocking arm 102 is positioned in contact slot 208, it blocks rotation or movement of crank member 206 and, thus of switch control handle 202, thereby not allowing operation of switch operating mechanism 200 of switching device 220. On the contrary, and as shown in FIG. 4, when in the second position, interlocking head 112 of interlocking arm 102 is retracted from contact slot 208 of crank member 206. When interlocking head 112 is retracted from contact slot 208, it allows rotation or movement of crank member 206 and switch control handle 202 thereby allowing operation of switch operating mechanism 200 or switching device 220.

Switch operating mechanism 200 further includes a plurality of door prongs 212. Plurality of door prongs 212 form a door safety mechanism that does not allow door 306 of cabinet 300 that includes switching device 220 to open when switch control handle 202 is in the second position (that is, the power on configuration). In some examples, plurality of door prongs 212 are configured to not allow rotation or movement of switch control handle 202 to the operating second position (that is, the power on configuration) when door 306 of cabinet 300 is in the open position. In some other examples, plurality of door prongs 212 are configured to not allow opening of door 306 of cabinet 300 when switch control handle 202 is at the operating second position.

Figure 6A:
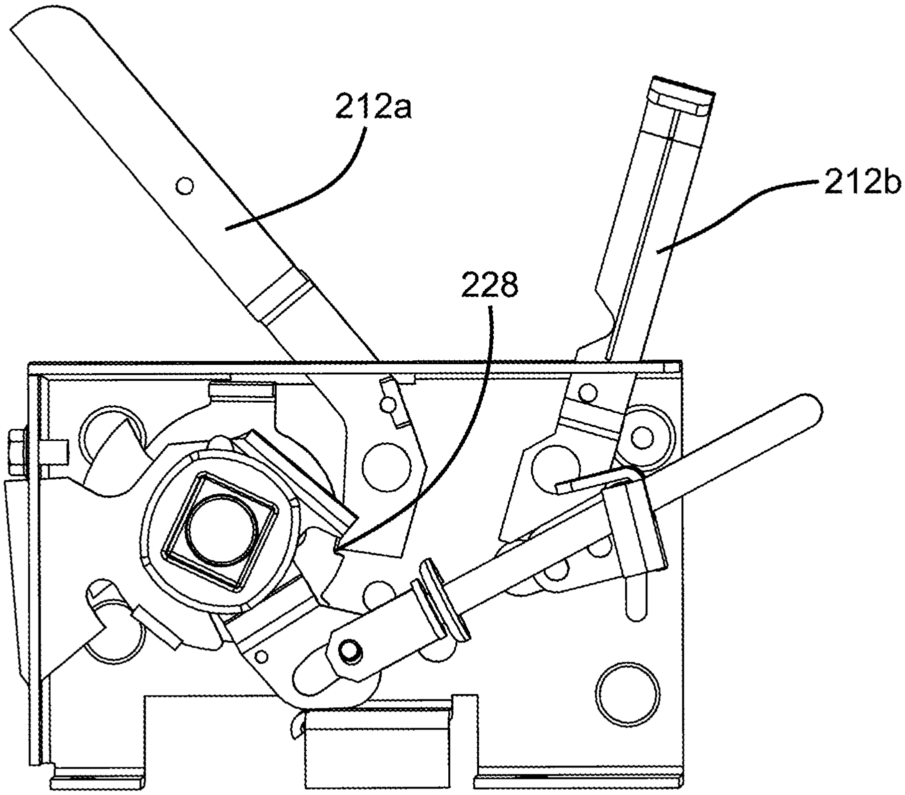
FIGS. 6A and 6B illustrate door safety mechanism of a switching device.
Figure 6B:
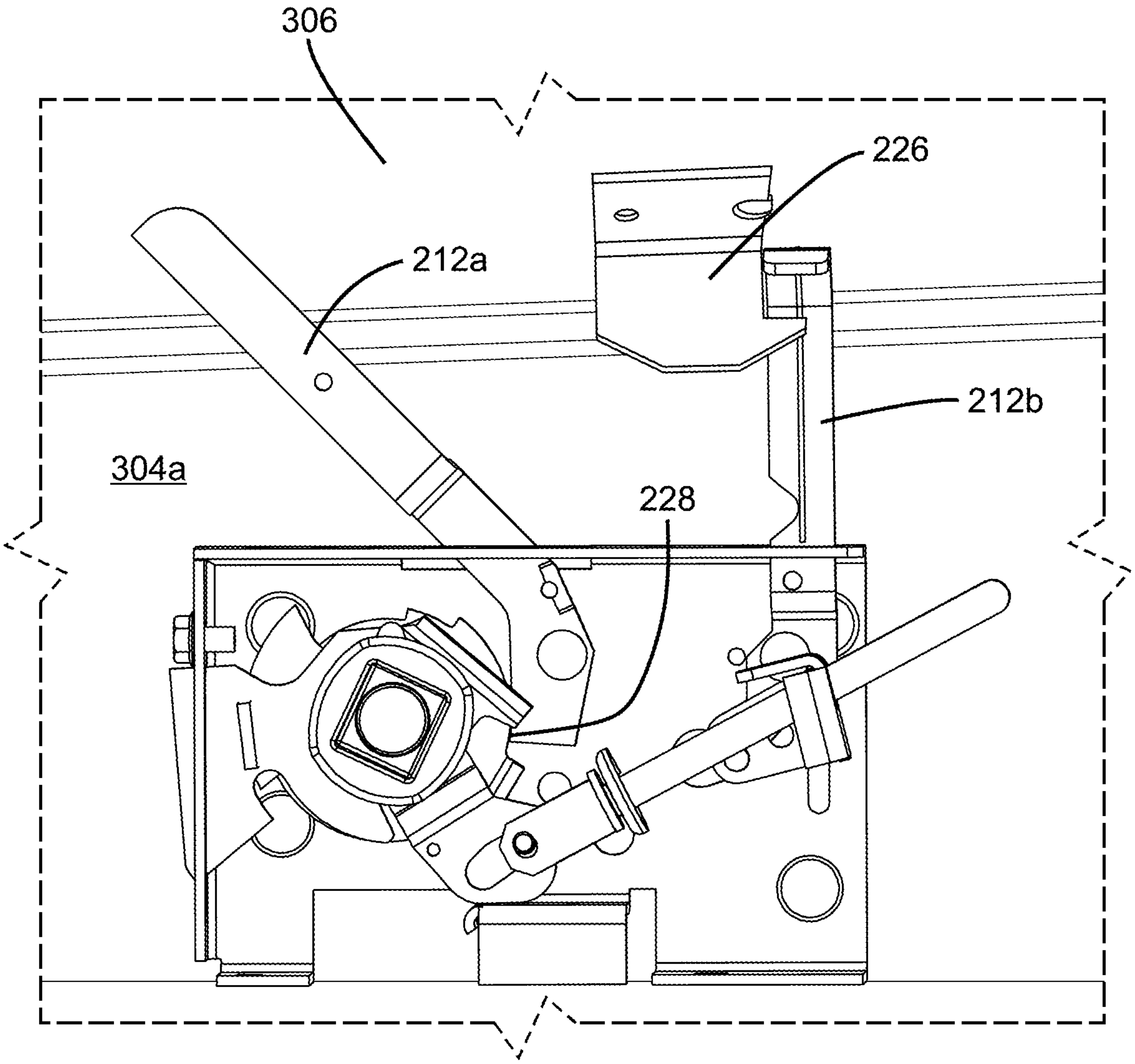

As shown in FIGS. 6A and 6B, plurality of door prongs 212 include a first door prong **212*a* and a second door prong 212*b*. First door prong 212*a* is connected to second door prong by a door spring member 230. First door prong 212*a* engages with a prong hook 228 of crank member 206. For example, when door 306 is open, first door prong 212*a* engages with prong hook 228 (see FIG. 6A) thereby inhibiting rotation of crank member 206, and by extension, of switch control handle 202 to the second operating position. Thus, plurality of door prongs 212 block switching on switching device 220 when door 306 of cabinet 300 is open. When door 306 is in closed position and switch control handle 202 is at the second operating position, a hook portion of second door prong 212***b* engages with a door safety hook 226 located on a door 306 of cabinet 300 of switching device 220 (see FIG. 6B) thereby blocking operation of door 306.

Returning to FIG. 5, switch operating mechanism 200 further includes a plurality of fasteners 218 to fasten or couple switch operating mechanism 200 to cabinet 300. Switch operating mechanism 200 further includes a link member 214 and a support shaft 216. Link member 214 is connected to both crank member 206 and support shaft 216. For example, a first end of link member 214 is connected to crank member 206 and a second end of link member 214 is connected to a first end of support shaft 216. In certain examples, link member 214 and support shaft 216 help in operation of switch operating mechanism 200. For example, link member 214 and support shaft 216 provide supporting movement in shifting or moving switch control handle 202 between the first operating position and the second operating position.

FIG. 7 illustrates switching device 220 and switching units 224 of switching device 220. For example, and as shown in FIG. 7, switching device 220 can include a plurality of switching units 224, for example, a first switching unit 224*a*, a second switching unit 224*b*, and a third switching unit 224*c*. Although, switching device 220 of FIG. 6 is shown to include three switching units, it can include a different number of switching units (for example, one, two, four, five, etc.).

In some examples, each of plurality of switching units 224 include an assembly of electrical contacts that are switchable or shiftable between an open configuration (or an open condition) and a closed configuration (or closed condition). The assembly of electrical contacts are connected to an actuator shaft 222 that shifts the electrical contacts between their open and closed configurations. For example, actuator shaft 222 is connected to crank member 206 at handle pivot axis 204 and is moveably connected to switch control handle 202. For example, actuator shaft 222 rotates or moves when switch control handle 202 is rotated or moved between the first position and the second position. In some examples, actuator shaft 222 rotates in a same direction as switch control handle 202. Hence, when switch control handle 202 is rotated to the off position (that is, the first position), actuator shaft 222 shifts the electrical contacts to the open configuration, and when switch control handle 202 is rotated to the on position (that is the second position), actuator shaft 222 shifts the electrical contacts to the closed configuration. In some examples, at any given time, each of plurality of switching units 224 have a same configuration, either open or closed. In the open configuration, no current flows through the plurality of switching unites while in the closed configuration electric current flows through the plurality of switching unites.

Figure 8:
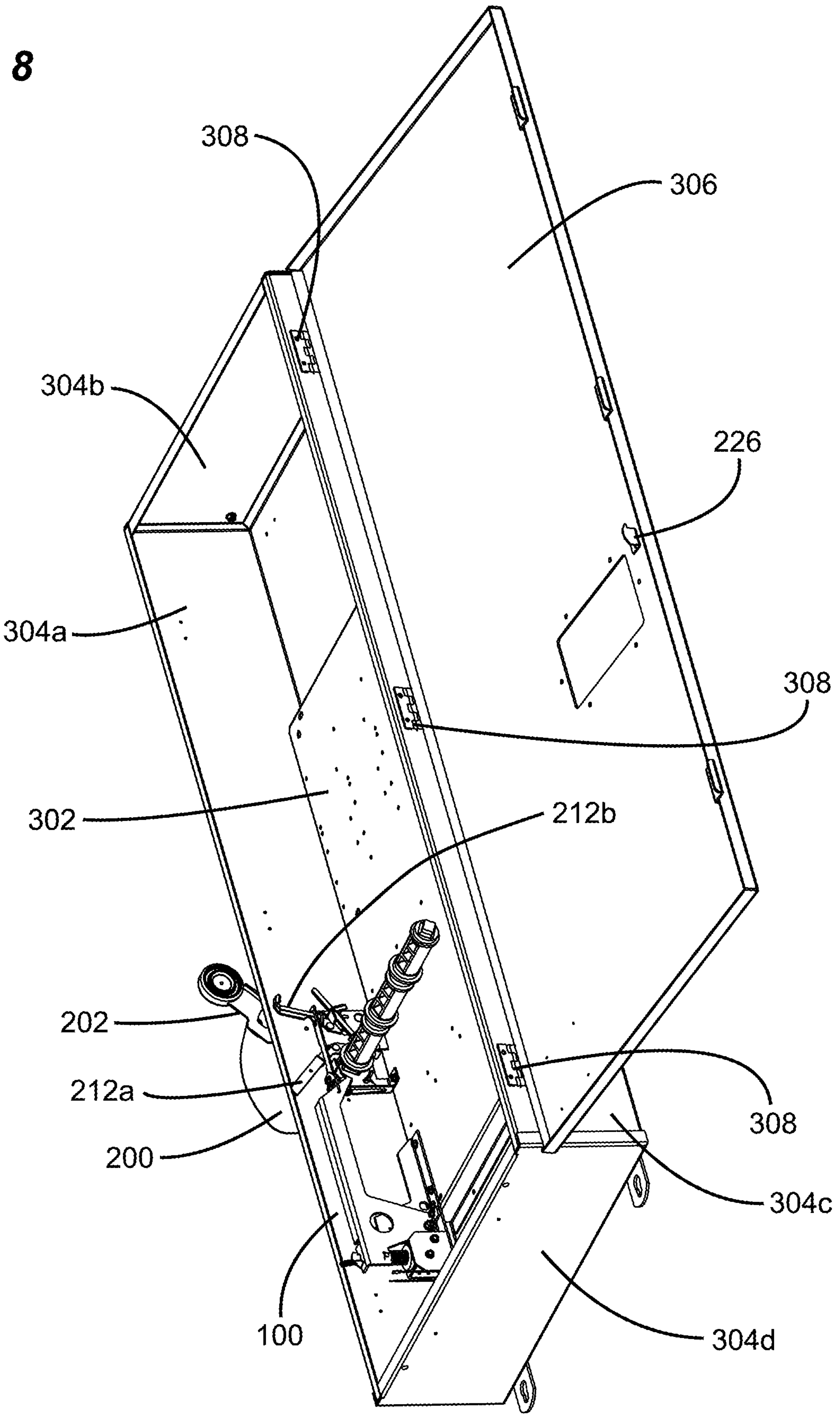
FIG. 8 illustrates an example enclosure for housing the switching device of FIG. 6.

FIG. 8 illustrates an example cabinet 300 of switching device 220. In some examples, cabinet 300, also referred to as an enclosure 300, includes a back wall 302 and a plurality of side walls, that is, a first side wall 304*a*, a second side wall 304*b*, a third side wall 304*c*, and a fourth side wall 304*d*. In addition, enclosure 300 includes door 306. Door 306 can be hinged on one of the sidewalls, for example, third side wall 304*c*, using one or more hinges 308 and can swing freely on hinges 308.

Continuing with FIG. 8, elements of switching device 220 including interlocking mechanism 100 and switch operating mechanism 200 are mounted inside cabinet 300. For example, and as shown in FIG. 8, interlocking mechanism 100 and switch operating mechanism 200 are mounted on back wall 302 and closer to first side wall 304*a* of cabinet 300. Switch control handle 202 is located outside of first side 304*a* for cabinet 300. In certain examples, although shown mounted closer to first side wall 304*a*, interlocking mechanism 100 and switch operating mechanism 200 can be mounted closer to any of first side wall 304*a*, second side wall 304*b*, third side wall 304*c*, and fourth side wall 304*d*.

Figure 9:
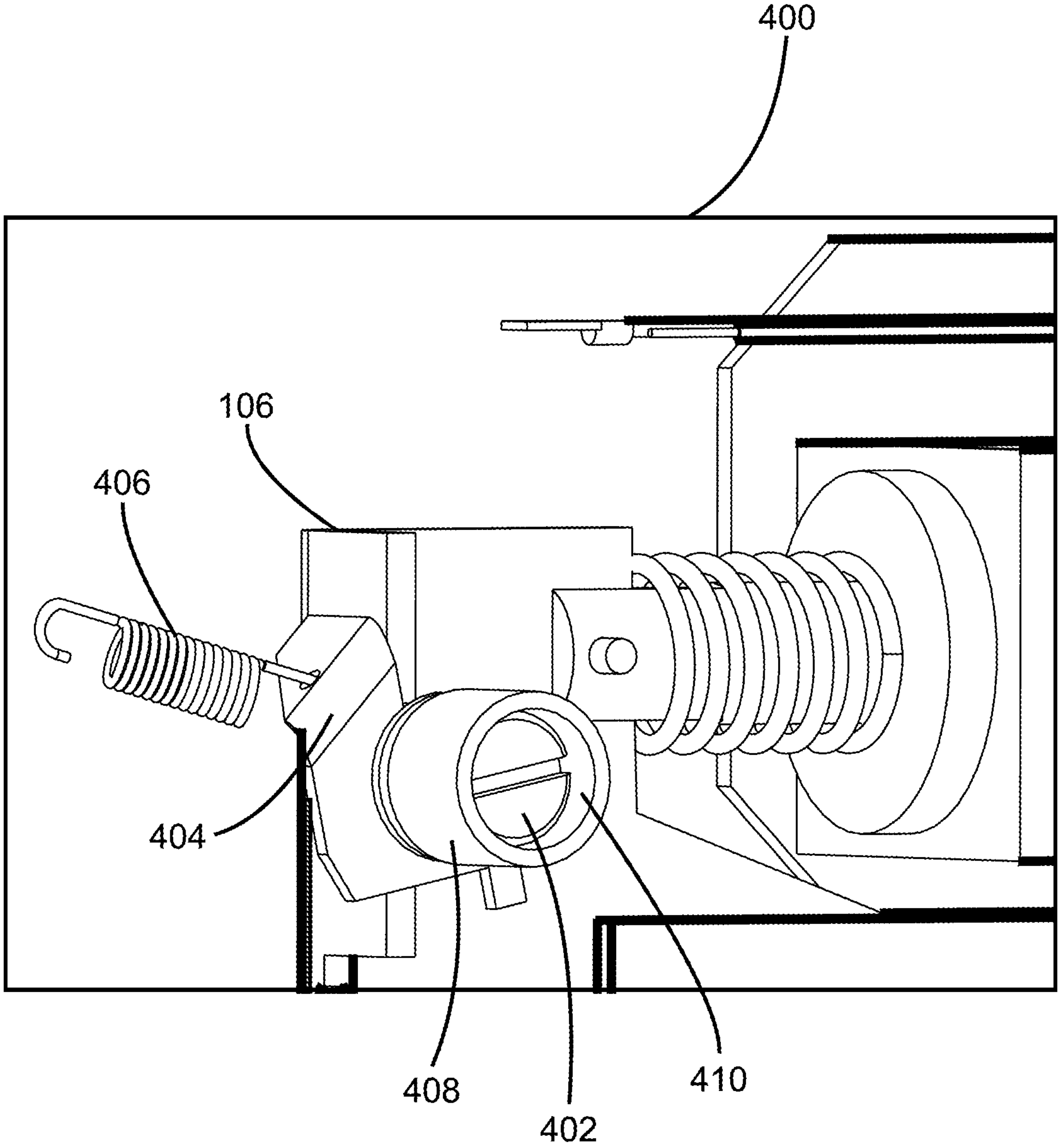
FIG. 9 illustrate an example defeat mechanism for the interlocking mechanism of FIGS. 1-3 in accordance with the principles of the present disclosure.

FIG. 9 illustrate an example defeat or override mechanism 400 for interlocking mechanism 100. Defeat mechanism 400 allows a user or an authorized user to defeat and operate electrical switch irrespective of whether an actuator signal has been received or not. As shown in FIG. 8, defeat mechanism 400 includes an override actuator 402. Defeat mechanism 400 further includes an override arm 404 and an override spring 406. A first end of override actuator 402 is located in a socket head 408 with a recess 410 shaped to receive a tool, for example, a screwdriver. In certain examples, the tool and socket head 408 can have a unique shape so as to provide a key function that allows only authorized personal to operate defeat mechanism 400. A second end of override actuator 402 is connected to override arm 404. Override spring 406 is also connected to override arm 404. Override arm 406 is in contact with second end 106 of interlocking arm 102 of interlocking mechanism 100.

In some examples, override actuator 402 is located outside of cabinet 300 and can be rotated to activate override mechanism 400. In some other examples, override actuator 402 is located inside of cabinet 300 and is accessible through a hole in cabinet 300. Override actuator 402 is rotated to adjust position of override arm 404 against bias of override spring 406. For example, when override actuator 402 is rotated, override arm 404 rotates in a same direction of override actuator 402 thereby moving interlocking arm 102 of interlocking mechanism 100 from the first position to the second position. Hence, when override actuator 402 is rotated, interlocking arm 102 retracts from the releasable contact with switch operating mechanism 200 thus defeating interlocking mechanism 100 and allowing operation of switching device 220.

Figure 10:
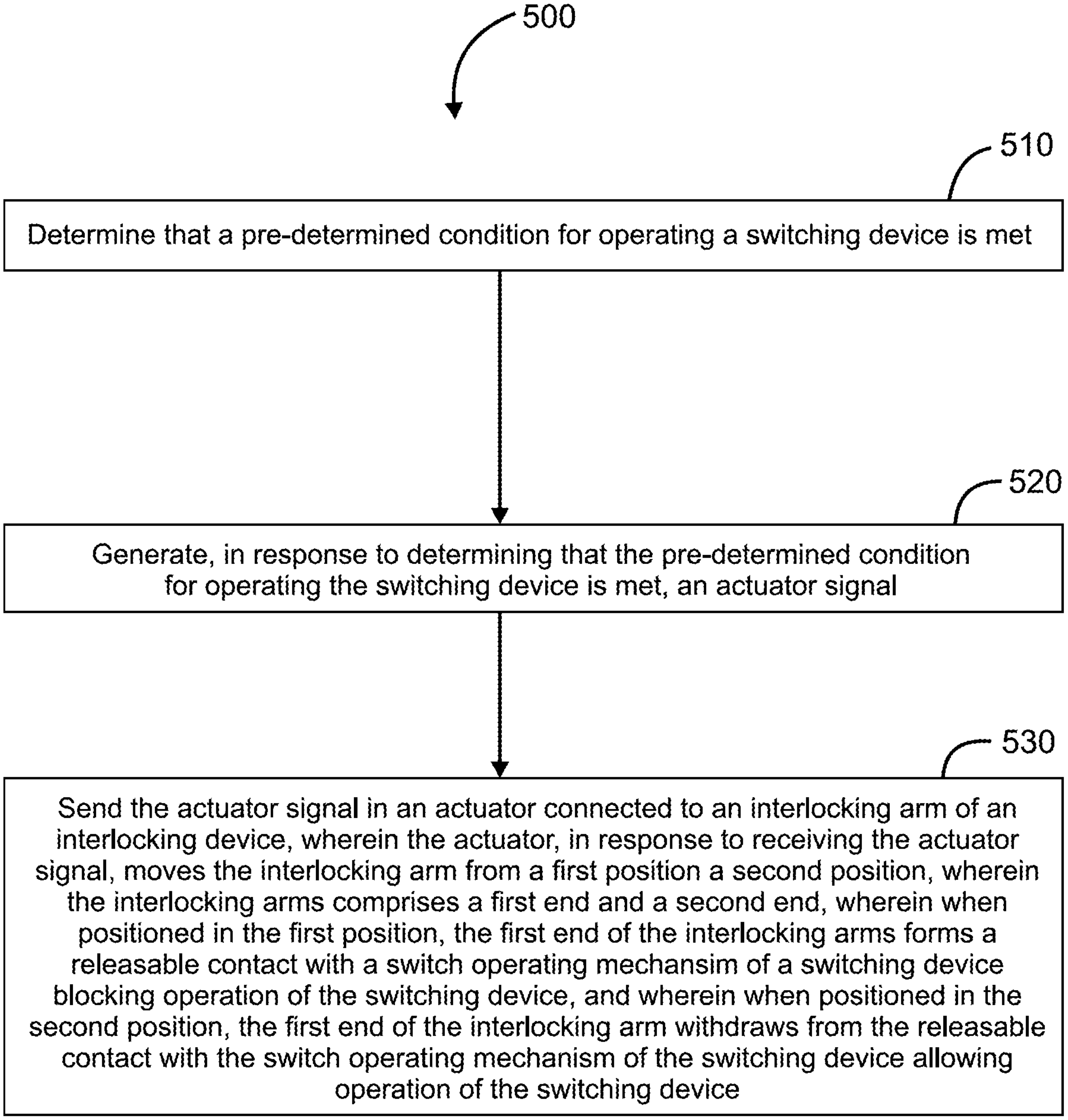
FIG. 10 illustrates a flow diagram of a method for operating a switching device in accordance with the principles of the present disclosure.

FIG. 10 illustrates a flow diagram of a method 500 for operating switching device 220. At block 510 of method 500, it is determined that a pre-determined condition for operating switching device 220 is met. In certain examples, programmable circuit 136 determines that pre-determined condition for operating switching device 220 is met. In examples, programmable circuit 136 compares the predetermined conditions with one or more current conditions to determine that pre-determined condition for operating switching device 220 is met. For example, programmable circuit 136 can determine that one or more loads are switched off. In another example, programmable circuit 136 can determine that a device or equipment that draws more than a predetermined amount of current is switched off. In yet another example, programmable circuit 136 can determine that exposed wires or exposed contacts are covered to sealed.

At block 520 of method 500, an actuator signal is generated in response to determining that the pre-determined condition for operating switching device 220 is met. For example, programmable circuit 136 generates an actuator signal in response to determining that a pre-determined condition for operating switching device 220 is met.

At block 530 of method 500, the actuator signal is sent to actuator 108 connected to interlocking arm 102 of an interlocking mechanism 100. For example, programmable circuit 136 sends the actuator signal to actuator 108. Actuator 108, in response to receiving the actuator signal, moves interlocking arm 102 from a first position to a second position. Interlocking arm 102 includes first end 104 and second end 106. When positioned in the first position, first end 104 of interlocking arm 102 forms a releasable contact with switch operating mechanism 200 of switching device 220 blocking operation of switching device 220. When positioned in the second position, first end 104 of interlocking arm 102 withdraws from the releasable contact with switch operating mechanism 200 of switching device 220 allowing operation of switching device 220.

Various modifications and alternations of this disclosure will become apparent to those skilled in the art without departing from the scope and spirit of this disclosure, and it should be understood that the inventive scope of this disclosure is not to be unduly limited to the illustrative embodiments set forth therein.

What is claimed is:

1. An interlocking mechanism for a switching device, the interlocking mechanism comprising:
- an interlocking arm comprising a first end and a second end, wherein the interlocking arm is movable between a first position and a second position, wherein, when positioned in the first position, the first end of the interlocking arm forms a releasable contact with a switch operating mechanism of a switching device blocking operation of the switching device, and wherein, when positioned in the second position, the first end of the interlocking arm retracts from the releasable contact with the switch operating mechanism of the switching device allowing operation of the switching device; and
- an actuator connected to the interlocking arm, wherein the actuator, in response to receiving an actuator signal, moves the interlocking arm between the first position and the second position.

2. The interlocking mechanism of claim 1, wherein the actuator comprises a solenoid, and wherein the solenoid is energized in response to receiving the actuator signal and moves the interlocking arm from the first position to the second position.

3. The interlocking mechanism of claim 1, wherein the actuator signal is generated in response to completion of a pre-determined condition for operating the switching device.

4. The interlocking mechanism of claim 1, wherein the actuator signal is received from a programmable device, wherein the programmable device is operative to:
- determine that a pre-determined condition for operating the switching device is met;
- generate, in response to determining that the pre-determined condition for operating the switching device is met, the actuator signal; and
- send the actuator signal to the switching device.

5. The interlocking mechanism of claim 1, wherein the actuator signal is received over a wire or wirelessly.

6. The interlocking mechanism of claim 1, wherein the interlocking arm is movable at a pivot point.

7. The interlocking mechanism of claim 1, further comprising a status indicator connected to the interlocking arm, wherein the status indicator is configured to:
- determine a current position of the interlocking arm; and
- provide an indication indicating the current position of the interlocking arm.

8. The interlocking mechanism of claim 1, further comprising an override mechanism configured to override the interlocking mechanism.

9. The interlocking mechanism of claim 1, wherein the interlocking mechanism is mounted inside an enclosure comprising the switching device.

10. A switching device comprising:
- a cabinet;
- a switch control handle mounted outside the cabinet, the switch control handle pivotally movable about a handle axis between an off position and an on position;
- a circuit unit mounted inside the cabinet;
- an actuator shaft connected to the circuit unit and the switch control handle, wherein the actuator shaft shifts the circuit unit to an open configuration when the switch control handle moves to the off position and shifts the circuit unit to a closed configuration when the switch control handle moves to the on position;
- a crank member pivoted at the handle axis and connected to the switch control handle;
- an interlocking arm comprising a first end and a second end, wherein the interlocking arm is movable between a first position and a second position, wherein when positioned in the first position, the first end of the interlocking arm forms a releasable contact with the crank member blocking pivotal movement of the switch control handle at the handle axis, and wherein when positioned in the second position, the first end of the interlocking arm withdraws from the releasable contact with the crank member allowing operation of the switch control handle; and
- an actuator connected to the interlocking arm, wherein the actuator, in response to receiving an actuator signal, moves the interlocking arm between the first position and the second position.

11. The switching device of claim 10, wherein the actuator comprises a solenoid.

12. The switching device of claim 10, further comprising a status indicator connected to the interlocking arm, wherein the status indicator determines a current position of the interlocking arm and provides an indication corresponding to the current position.

13. The switching device of claim 10, further comprising an override mechanism, wherein the override mechanism, when activated, moves the interlocking arm to the second position.

14. The switching device of claim 10, further comprising a programmable circuit, wherein the programmable circuit generates the actuator signal in response to determining that a pre-determined condition for operating the switch control handle is met.

15. The switching device of claim 14, wherein the programmable circuit is located inside the cabinet.

16. The switching device of claim 10, wherein the interlocking arm comprises an interlocking head, wherein the crank member comprises a slot, wherein the interlocking head is positioned in the slot when the interlocking arm is in the second position forming releasable contact with the crank member.

17. A method of operating a switching device, the method comprising:
- determining that a pre-determined condition for operating a switching device is met;
- generating, in response to determining that the pre-determined condition for operating the switching device is met, an actuator signal; and sending the actuator signal to an actuator connected to an interlocking arm of an interlocking mechanism, wherein the actuator, in response to receiving the actuator signal, moves the interlocking arm from a first position to a second position, wherein the interlocking arm comprises a first end and a second end, wherein, when positioned in the first position, the first end of the interlocking arm forms a releasable contact with a switch operating mechanism of a switching device blocking operation of the switching device, and wherein, when positioned in the second position, the first end of the interlocking arm withdraws from the releasable contact with the switch operating mechanism of the switching device allowing operation of the switching device.

18. The method of claim 17, wherein sending the actuator signal to the actuator comprises sending the actuator signal over a wire.

19. The method of claim 17, wherein sending the actuator signal to the actuator comprises sending the actuator signal over a wirelessly.

20. The method of claim 17, further comprising:

sending another actuator signal to the actuator, wherein the actuator, in response to receiving the another actuator signal, moves the interlocking arm from the second position to the first position.

* * * * *